PHOTOELECTRIC DEVICE FOR DETECTING TAPE IN TWO POSITIONS INCLUDING MIRROR WITH HOLE IN IT

Filed April 26, 1966

INVENTOR
ALF J. OLSEN
BY R. C. Terry
ATTORNEY

United States Patent Office 3,473,033

Patented Oct. 14, 1969

3,473,033

PHOTOELECTRIC DEVICE FOR DETECTING TAPE IN TWO POSITIONS INCLUDING MIRROR WITH HOLE IN IT

Alf J. Olsen, Elk Grove Village, Ill., assignor to Teletype Corporation, Skokie, Ill., a corporation of Delaware Filed Apr. 26, 1966, Ser. No. 545,601
Int. Cl. G01n *21/30*
U.S. Cl. 250—219 16 Claims

ABSTRACT OF THE DISCLOSURE

A device for detecting light reflected from tapes positioned in at least two positions comprising a light source, a curved mirror positioned between the light source and the tape and having a hole formed through it for permitting light for the source to strike the tape and at least one photosensitive device positioned adjacent the mirror for detecting light from the source that is reflected from the tape and the mirror.

This invention relates to tape or web moving or transporting devices and more particularly to a device for locating optically discernable indicia, such as reflective strips, on tapes or webs.

When tapes or webs are moved or transported through recording or other devices it is often desirable to indicate changes in character of the web with optically discernable indicia so that the change in character of the web can be detected by a photosensitive device which in turn produces a signal indicating the change in character of the web. For example, magnetic tapes are frequently provided with reflective strips which indicate the end of a leader or trailer portion of the tape and the start of a recordable portion. These strips are used to control recording mechanisms so that the recording mechanism will not operate when it is engaged with either the leader or the trailer portion of the tape. In the past reflective strips have been detected on the tape by simply directing a light beam onto the tape and by detecting any light reflected from the tape directly with a photosensitive device. This method is adequate when the tape is always in the same position relative to the photosensitive device. It is inadequate, however, in devices where the tape occupies more than one position relative to the light beam and to the photosensitive device since in at least one of these positions light from the light beam which is reflected from the tape will not strike the photosensitive device.

Accordingly, an object of this invention is to provide a device for optically detecting indicia on webs regardless of the position of the web relative to the device.

A more specific object of this invention is to provide a device for directing light reflected from a reflective strip on a magnetic tape onto a photosensitive device regardless of the position of the tape relative to the device.

In the preferred embodiment of the invention these and other objects are achieved by directing light reflected from the magnetic tape onto a photosensitive device by means of a curved mirror. A light beam is directed onto tape through a hole in the mirror and, when light from the light beam strikes a reflective portion of the tape, the light is reflected onto the mirror and it is then directed by the mirror onto the photosensitive device.

A more complete understanding of the invention may be had by referring to the following detailed description when taken in conjunction with the drawings wherein.

Figures 1, 2, 3:
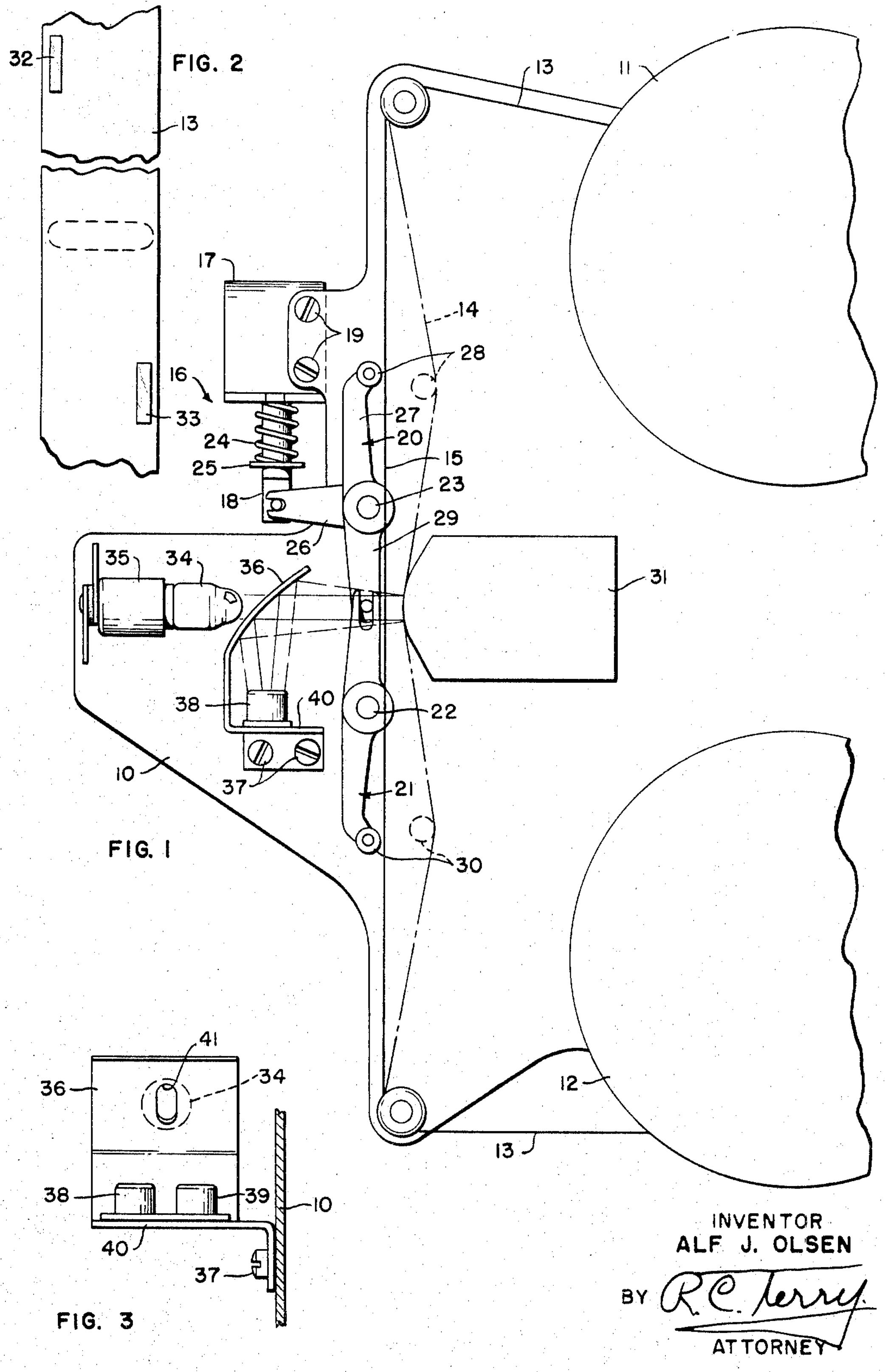
FIG. 1 is a front view of a magnetic tape device employing the present invention.
FIG. 2 is a schematic illustration of a length of magnetic tape.
FIG. 3 is a side view of the reflective strip detecting portion of the device shown in FIG. 1.

Referring now to the drawing wherein like reference numerals designate like parts throughout the several views there is shown in FIG. 1 a magnetic tape device. The device is comprised of a frame 10 upon which a pair of tape reels 11 and 12 are rotatably mounted. The tape reels 11 and 12 are rotated by a pair of motors (not shown) to cause a magnetic tape or web 13 to pass back and forth between them as the magnetic tape 13 is acted upon by the magnetic tape device.

As the magnetic tape 13 passes between the tape reels 11 and 12 it is deflected into either an active path 14 (shown in dashed lines in the drawing) or into a dormant path 15 (shown in solid lines in the drawing) by a tape deflecting mechanism 16. The tape deflecting mechanism 16 is comprised of a solenoid 17 having a core or plunger 18 which is mounted on the frame 10 by means of a pair of fasteners 19 and a pair of oscillatable levers 20 and 21 which are pivotally attached to the frame 10 by means of a pair of pivots 22 and 23.

The plunger 18 of the solenoid 19 is normally held in a downward position by means of a compression spring 24 which acts upon a shoulder 25 of the plunger 18. Attached to the plunger 18 by means of a pin and slot connection is a rightward extending arm 26 of the lever 20. When the solenoid is actuated by being connected to a source of electrical energy (not shown) the core of plunger 18 is retracted into the solenoid 17 against the action of spring 24. This causes the lever 20 to rock clockwise about the pivot 23 and thereupon causes an upwardly extending arm 27 of the lever 20 to move to the right. This causes a tape engaging roller 28 which is pivotally attached to the arm 27 to move to the right and thereby causes the tape 13 to be deflected out of the path 15 and into the path 14.

The lever 20 is connected by means of a downwardly extending arm 29 to the lever 21 through a pin and slot connection. Therefore, when the arm 20 is rocked clockwise by the action of the solenoid 17 on the plunger 18 the arm 29 is moved to the left and the lever 21 is caused to rock counterclockwise about the pivot 22. This causes a tape engaging roller 30 which is pivotally connected to the lever 21 to move to the right and thereby cause the guide 30 to deflect the tape 13 out of the path 15 and into the path 14.

When the web 13 is deflected into the path 14 by the guides 28 and 30, it frictionally engages a tape transducer head 31 which is attached to the frame 10. The tape transducer head 31 is operable upon the tape 13 to record information on the tape and/or to read previously recorded information from the tape. Thus, when the tape is in the active path 14 it is in position to be acted upon by the tape transducer head 31. When, however, the tape 13 is in the dormant path 15 it is not in position to be acted upon by the head 31 and is thus in a position to be moved in a high speed manner between the tape reels 11 and 12.

This operation is normally referred to as a rewind operation and is used to bring the start or the end of the tape past the tape transducer head 31.

Referring now to FIG. 2 there is shown a schematic illustration of the magnetic tape 13. Typical magnetic tapes are provided with leader and trailer portions which are used to connect the tape 13 to the tape reels 11 and 12 and which are not covered with a recordable surface. Between the leader and trailer portions is the bulk of the tape 13 which is covered with a recordable surface so that information may be recorded thereon. The magnetic tapes are typically provided with a pair of reflective strips such as the strips 32 and 33 one of which is mounted on the one side of the longitudinal center line of the tape and the other of which is mounted on the other side of the center line. In the magnetic tape shown in FIG. 2 the reflective strip 32 is used to designate the end of a leader portion of the tape and the start of the recordable portion whereas the reflective strip 33 is used to designate the end of the recordable portion and the start of the trailer portion. Thus, by noting when the reflective strips 32 and 33 pass over the transducer head 31 it can be determined when information can be recorded on the tape due to a change in character of the tape from the non-recordable leader portion to the recordable main body of the tape and when information can no longer be recorded on the tape due to a change in character in the tape from the recordable main body portion to the non-recordable trailer portion.

Referring now to FIGS. 1 and 3 there is shown a device for detecting the reflective strips 32 and 33 on the magnetic tape 13. The device is comprised essentially of a pre-focused lamp 34 which is mounted in a socket 35 that is attached to the frame 10 and that is connected to a source of electricity (not shown), a curved mirror 36 which is attached to the frame 10 by means of a pair of fasteners 37 and which is preferably in the form of a conic section such as a parabola and a pair of photosensitive devices 38 and 39 which are supported by a bentover portion 40 of the mirror 36.

As is best shown in FIG. 3 the mirror 36 has a hole 41 formed through it. The lamp 34 is mounted directly behind the hole 41 in the mirror 36 so that it directs a beam of light through the hole 41 and onto the magnetic tape 13 regardless of whether the magnetic tape 13 is in the active path 14 or the dormant path 15 as controlled by the tape deflecting mechanism 16. The lamp 34 is of the pre-focused variety so that the lamp in conjunction with the hole 41 in the mirror 36 causes a pattern of light of the configuration shown in dashed lines on the magnetic tape 13 of FIG. 2 to appear on the tape.

Magnetic tapes are normally dark in color and, therefore, the light beam which extends from the lamp 34 through the hole 41 and onto the tape 13 normally is not reflected by the tape. However, when one or the other of the reflective strips 32 and 33 is passed under the light beam a reflective surface is presented to the light beam from the lamp 34. When this occurs light from the light beam is reflected from the tape 13 onto the mirror 36 and is thereupon directed onto one or the other of the photosensitive devices 38 and 39 depending on which of the reflective strips 32 and 33 appears under the light beam.

The light reflected from the reflective strips 32 and 33 will be directed by the mirror 36 onto the photosensitive devices 38 and 39 regardless of whether the tape 13 is in the path 14 or the path 15 due to the curved nature of the mirror 36. Thus, if the tape is in the dormant path 15 light from the light beam will be reflected from the tape in a path lying parallel to the light beam in FIG. 1 but extending just to the left or just to the right of the light beam as viewed in FIG. 3 depending on which of the reflective strips 32 and 33 the light beam is reflected from. Light reflected from the strips 32 and 33 will be thereupon directed by the mirror 36 onto one or the other of the photosensitive devices 38 and 39 and will thus activate one or the other of the devices 38 and 39 to produce a signal indicating a change in character of the web 13 as it passes under the reflective strips detecting apparatus and over the tape transducer head 31. The signal from the photosensitive device 38 or 39 may be employed to control the tape transducer head 31, the tape reels 11 and 12, and/or the tape deflecting device 16 to cause a change in the manner in which the tape is being acted upon by the magnetic tape device.

When the magnetic tape 13 is deflected into the active path 14 by the tape deflecting apparatus 16 it is brought into engagement with the tape transducer head 31 which causes the tape to assume a somewhat curved path in the area of the reflective strip locating apparatus. Thus, when the light beam from the lamp 34 strikes one of the reflective strips 32 and 33 when the tape is in the active path 14 it is not reflected in a path parallel to the light beam but is instead caused to follow a diverging path as indicated by the dashed lines in FIG. 1. Divergence of the reflected light when tape is in the active path is detrimental to the detection of the reflected light by the photosensitive devices 38 and 39 since it reduces the amount of light per unit of area and thereupon makes differentiation of the reflected light from background illumination difficult. This problem is overcome by the curved nature of the mirror 36 which gathers light from the light beam which is reflected by either of the reflective strips 32 or 33 and which causes the reflected light to follow a converging path onto the photosensitive devices 38 and 39. Thus, the mirror 36 gathers the reflected light and causes a major portion of the reflected light to impinge upon the photosensitive devices 38 and 39 and thereby allows differentiation of the reflected light from background illumination.

It should be noted that the tape reels 11 and 12, the tape 13, the guides 28 and 30, the tape transducer 31, the lamp 34 and the mirror 36 all lie in a common plane extending parallel to the frame 10. Thus, the guides 28 and 30 cause the tape 13 to assume two paths one of which is closer to and the other of which is farther from the mirror 36 in a direction measured in the plane just described. Due to its curved nature the mirror 36 allows the tape 13 to be directed into paths in the plane which are farther from the mirror and the photosensitive devices than would otherwise be possible since the mirror acts to collect and converge the light which naturally tends to diverge and become weaker as the distance increases even if the surface from which it is reflected is flat.

It should also be noted that, in addition to allowing the photosensitive devices 38 and 39 to detect light reflected from the reflective strips 32 and 33 when the tape 13 is in two different positions relative to the mirror 36, the mirror 36 acts as a screen which prevents light from the lamp 34 from impinging upon the photosensitive devices 38 and 39 except when that light is reflected from one of the reflective strips 32 and 33. Thus, the mirror 36 acts to reduce the background illuminations sensed by the photosensitive devices 38 and 39 and thus renders the devices more sensitive to light reflected from the lamp 34 by the reflective strips 32 and 33.

It should finally be noted that in many applications it may be more desirable to provide a light colored tape or web 13 and to position thereon dark colored indicia similar to the strips 32 and 33 for indicating changes in character of the web. In this condition light reflected from the tape or web would normally be directed from the tape by the mirror 36 onto the photosensitive devices 38 and 39 and an absence of light so directed would be indicative of a change of character in the tape. This difference, however, has no effect on the operation of the device.

Although only one embodiment of the invention is shown in the drawing and described in the foregoing specification, it will be understood that invention is not limited to the specific embodiment described, but is capable of modification and rearrangement and substitution of parts and elements without departing from the spirit of the invention.

What is claimed is:

1. A web control device including:
- a web guide normally positioned in a predetermined position for guiding a web in a predetermined path;
- means for moving the web guide to a different position thereby causing the web to assume a different path;
- means for generating a beam of light;
- means for projecting said beam of light onto said web regardless of whether said web is in said predetermined path or said different path;
- means responsive to light reflected from said web for generating a signal; and
- means for directing light reflected from said web onto the responsive means regardless of whether said web is in said predetermined path or said different path.

2. The web control device according to claim 1 also including a web controlled transducer device and wherein said web guide when in said predetermined position guides said tape in said predetermined path which lies a first distance from said responsive means and which extends over and in contact with the web controlled transducer and when in said different position guides said web in said different path which lies a second distance from said responsive means and out of contact with said web controlled transducer.

3. The web control device according to claim 1 wherein said web has optically discernible areas formed on its surface which indicate a change in the character of the web, wherein the light directing means directs light from the light beam which is reflected by the areas onto the responsive means and wherein the responsive means responds to light reflected from the strips to generate signals indicating a change in character of the web.

4. The web control device according to claim 3 wherein the light directing means is a curved mirror which directs light reflected from the areas onto the responsive means regardless of whether the web is in said predetermined path or said different path.

5. The web control device according to claim 1 wherein the light directing means is positioned between the light generating means and the light responsive means and between the light generating means and the web.

6. In a tape transport device wherein the tape has optically discernible strips formed on its surface, wherein a light beam is projected onto the tape and wherein a photosensitive device is positioned to detect light from the light beam which is reflected by the strips and to thereupon produce a signal indicating the presence of a strip in the path of the light beam; the combination with said photosensitive device of:
- means to position the tape in two positions relative to the photosensitive device one of which is farther from the photosensitive device than the other; and
- means for directing light reflected from the strips on the tape onto the photosensitive device regardless of which of the two positions the tape is in.

7. The combination according to claim 6 wherein the directing means is a curved mirror which gathers light from the light beam which is reflected by the strips and directs it onto the photosensitive device and wherein one of the positions which the positioning means positions the tape in is farther radially from the mirror than the other of the positions.

8. The combination according to claim 7 wherein the curved mirror has a hole formed through it and wherein the light beam is projected through the hole in the mirror onto the tape.

9. A tape transport system for use with tapes having optically discernible indicators indicating a change in character of the tape including:
- a frame;
- a pair of tape reels rotatably mounted on the frame;
- means for causing tape to be unwound from one of the reels and wound onto the other of the reels and vice versa;
- a tape transducer mounted on the frame;
- guide means mounted on the frame for causing the tape to follow a first path in which the tape engages the transducer when the tape is unwound from one of the reels and wound onto the other of the reels and for causing the tape to follow a second path in which the tape is out of contact with the transducer when the tape is unwound from the other of the reels and wound onto the one of the reels;
- a light source mounted on the frame adjacent the transducer for directing a light beam onto the tape;
- light sensitive means mounted on the frame adjacent the light source for detecting light from the light which is reflected by the optically discernible indicator on the tape and for thereupon producing a signal indicating a change in the character of the tape; and
- means mounted on the frame between the light source and the light sensitive means and between the light source and the tape for directing light from the light source which is reflected by the optically discernible indicator on the tape onto the light sensitive means regardless of whether the tape is in the first or the second path.

10. The tape transport system according to claim 9 wherein the tape reels, the tape transducer, and the light directing means all lie substantially in a common plane and wherein the guide means causes the tape to follow a second path which is closer to the light directing means than the first path when measured in a direction parallel to the plane.

11. The tape transport system according to claim 10 wherein the light directing means is a curved mirror mounted on the frame and extending substantially perpendicularly to the plane.

12. The tape transport system according to claim 11 wherein the mirror has a hole formed through it and wherein the light beam passes from the light source through the hole in the mirror and onto the tape.

13. The tape transport system according to claim 12 wherein the light beam extends from the light source in a direction parallel to the plane and perpendicular to the tape regardless of whether the tape is in the first or the second path through the hole in the mirror and onto the tape and wherein when the light beam strikes an optically discernible indicator on the tape light is reflected from the tape in a direction parallel to the direction of the light beam onto the mirror and is then directed in a direction parallel to the plane and perpendicular to the direction of the light beam from the mirror onto the light sensitive means regardless of whether the tape is in the first or the second path.

14. As an article of manufacture, a device for attachment to a tape transport mechanism to gather light reflected from tapes traveling thereon comprising a unitary body of metal including a curved mirror section, a first straight section extending from the curved section, a second straight section extending from the first straight section at right angles with respect thereto and a third straight section extending from the second straight section at right angles with respect to both the first and the second straight sections.

15. The article according to claim 14 wherein curved section has a hole formed through it for permitting light to pass through the device and wherein the third straight section has at least one fastener receiving hole formed through it.

16. The article according to claim 14 further including at least one light sensitive device mounted on the second straight section for sensing light reflected from the curved section.

References Cited

UNITED STATES PATENTS

| | | | |
|---|---|---|---|
| 2,077,451 | 4/1937 | Wilson et al. | 250—220 |
| 2,721,229 | 10/1955 | Fitch | 178—17 |
| 2,984,747 | 5/1961 | Walker | 88—14 |
| 3,184,177 | 5/1965 | Hannah | 242—55.12 |

RALPH G. NILSON, Primary Examiner

M. ABRAMSON, Assistant Examiner

U.S. Cl. X.R.

242—12, 55